United States Patent
Murray et al.

(10) Patent No.: US 10,317,967 B2
(45) Date of Patent: Jun. 11, 2019

(54) POWER BRACKET SYSTEM

(71) Applicant: KLAS TECHNOLOGIES LIMITED, Dublin (IE)

(72) Inventors: Frank Murray, Dublin (IE); Mark Ryan, Dublin (IE); Enda Sullivan, Dublin (IE)

(73) Assignee: KLAS TECHNOLOGIES LIMITED, Dublin (IE)

( * ) Notice: Subject to any disclaimer, the term of this patent is extended or adjusted under 35 U.S.C. 154(b) by 0 days.

(21) Appl. No.: 15/449,310

(22) Filed: Mar. 3, 2017

(65) Prior Publication Data

US 2018/0253128 A1 Sep. 6, 2018

(51) Int. Cl.
*G06F 1/16* (2006.01)
*G06F 1/26* (2006.01)
*H04L 29/06* (2006.01)

(52) U.S. Cl.
CPC .............. *G06F 1/26* (2013.01); *G06F 1/1633* (2013.01); *G06F 1/1635* (2013.01); *G06F 1/266* (2013.01); *H04L 63/0272* (2013.01); *H04L 63/0428* (2013.01)

(58) Field of Classification Search
CPC .................................... H01R 9/22; G06F 1/26
USPC ........................ 439/638, 928; 361/790, 788
See application file for complete search history.

(56) References Cited

U.S. PATENT DOCUMENTS

| | | | | |
|---|---|---|---|---|
| 5,761,030 A | * | 6/1998 | Roscoe | G06F 1/184 312/333 |
| 5,897,400 A | * | 4/1999 | Amberg | G06F 1/181 439/347 |
| 6,553,418 B1 | * | 4/2003 | Collins | H04L 29/06 307/31 |
| 7,206,946 B2 | * | 4/2007 | Sakakibara | G06F 1/26 713/300 |
| 7,291,032 B1 | * | 11/2007 | Carver | H01R 43/26 439/310 |
| 7,315,444 B2 | * | 1/2008 | Chen | H01R 13/74 361/679.55 |
| 7,393,249 B2 | * | 7/2008 | Wagner | H01R 13/506 439/620.24 |
| 7,848,115 B2 | * | 12/2010 | Casto | G06F 1/18 361/788 |
| D673,935 S | * | 1/2013 | Lee | D14/240 |

(Continued)

*Primary Examiner* — Abdullah A Riyami
*Assistant Examiner* — Nader J Alhawamdeh
(74) *Attorney, Agent, or Firm* — Vorys, Sater, Seymour & Pease LLP

(57) ABSTRACT

The present subject matter relates to a power bracket system for mechanically coupling and facilitating communication between a first and second module to form a single portable system. The power bracket system includes a panel for electrically coupling to a first module and a second module; a linking arm, extending from the panel, for mechanically coupling the first module disposed on top of the second module; a power connector disposed on the panel for receiving DC power from an external power source; top and bottom power contacts configured to align with power input regions of the top and bottom modules and to deliver power from the power connector to the top and bottom modules; first and second Ethernet ports; and top and bottom Ethernet connectors for connecting the first and second Ethernet port to the top and bottom modules.

9 Claims, 10 Drawing Sheets

(56) References Cited

U.S. PATENT DOCUMENTS

| | | | | |
|---|---|---|---|---|
| 8,657,630 B1* | 2/2014 | Nelson | H01R 27/02 | 439/638 |
| 8,848,362 B1* | 9/2014 | Che | G05B 9/02 | 361/676 |
| 9,965,007 B2* | 5/2018 | Amelio | G06F 1/26 | |
| 2003/0030977 A1* | 2/2003 | Garnett | G06F 1/183 | 361/679.48 |
| 2003/0035471 A1* | 2/2003 | Pitsoulakis | H04M 11/062 | 375/222 |
| 2006/0057898 A1* | 3/2006 | Yi | H01R 13/641 | 439/719 |
| 2006/0082973 A1* | 4/2006 | Egbert | H05K 7/20154 | 361/709 |
| 2006/0092600 A1* | 5/2006 | Ewing | H01R 25/00 | 361/626 |
| 2006/0181398 A1* | 8/2006 | Martich | H04L 12/66 | 340/538 |
| 2007/0098011 A1* | 5/2007 | Spivey | H04L 45/00 | 370/463 |
| 2009/0019535 A1* | 1/2009 | Mishra | G06Q 10/00 | 726/12 |
| 2009/0122502 A1* | 5/2009 | Baran | H05K 7/1485 | 361/807 |
| 2010/0280636 A1* | 11/2010 | Holland | G05B 19/00 | 700/90 |
| 2011/0090634 A1* | 4/2011 | Tsuchida | G11B 33/08 | 361/679.31 |
| 2012/0087376 A1* | 4/2012 | Spivey | H04L 45/00 | 370/419 |
| 2013/0067248 A1* | 3/2013 | Wang | H05K 7/1492 | 713/300 |
| 2013/0342985 A1* | 12/2013 | Santos | G06F 1/1656 | 361/679.02 |
| 2014/0082719 A1* | 3/2014 | Persson | H04L 63/20 | 726/15 |
| 2014/0157397 A1* | 6/2014 | Dalal | G06F 13/1652 | 726/13 |
| 2015/0288419 A1* | 10/2015 | Tsai | H04B 3/542 | 375/258 |
| 2016/0351867 A1* | 12/2016 | Tonomura | H01M 2/021 | |
| 2017/0048278 A1* | 2/2017 | Tomasso | H04L 12/4633 | |
| 2017/0251013 A1* | 8/2017 | Kirti | H04L 63/1416 | |
| 2018/0034908 A1* | 2/2018 | Li | H04L 67/1097 | |
| 2018/0139871 A1* | 5/2018 | Stravets | H02M 7/003 | |

* cited by examiner

POWER BRACKET SYSTEM

BACKGROUND

The High Assurance Internet Protocol Interoperability Specification (herein after referred to as "HAIPE") is a standard protocol for secure communication specified by the National Security Agency. A red/black architecture 100, as illustrated in FIG. 1, is commonly implemented for securely communicating data. A red-side router 102, also referred to as an inner tunnel, provides access to applications and routes data traffic such as voice, video, email, and web in the form of red signals, or plaintext form. A black-side router 106, or an outer tunnel, encrypts the data traffic, using Advanced Encryption Standard, for example, before the data traffic goes out to a transport network 108 such as the public Internet, a commercial SATCOM network, or a private satellite, and onto a secure network 110. In order to comply with HAIPE, the red/black architecture 100 further includes an NSA certified HAIPE encryption device 104 for providing further encryption and security, based on an algorithm approved by the NSA, before data is sent to the red-side router.

Requiring a HAIPE encryption device 104, however, results in an increase in cost, size, weight, and power requirements for a red/black architecture 100, which may not be feasible when implementing a secure communication infrastructure. In addition, requiring an NSA approved HAIPE encryption device 104 may be perceived as a complex requirement and difficult to implement, which may detour such secure communication infrastructure implementations. Also, it may not be feasible to implement HAIPE compliant communications solutions using commercially available products. Thus, it may be beneficial to be able to remove the HAIPE encryption device 104 while still maintaining compliance with the NSA's HAIPE protocol for secure communication.

As a result, The NSA is developing new ways to leverage emerging technologies to deliver more timely solutions for rapidly evolving customer requirements. The NSA's Commercial Solutions for Classified (hereinafter referred to as "CSfC") Program has been established to enable commercial products to be used in layered solutions protecting classified NSA data. This will provide the ability to securely communicate based on the commercial standards in a solution that can be implemented more timely.

FIG. 2 illustrates an example CSfC architecture 200 in which the red-side router 202 now provides the second layer of encryption that was previously provided by the HAIPE encryption device 104 (now removed).

SUMMARY

The present subject matter relates to a power bracket system for mechanically coupling and facilitating communication between a first and second module to form a single portable system. The power bracket system includes a panel for electrically coupling to a first module and a second module; a linking arm, extending from the panel, for mechanically coupling the first module disposed on top of the second module; a power connector disposed on the panel for receiving DC power from an external power source; top and bottom power contacts configured to align with power input regions of the top and bottom modules and to deliver power from the power connector to the top and bottom modules; first and second Ethernet ports; and top and bottom Ethernet connectors for connecting the first and second Ethernet port to the top and bottom modules.

BRIEF DESCRIPTION OF THE DRAWINGS

In the accompanying drawings, structures are illustrated that, together with the detailed description provided below, describe exemplary embodiments of the claimed invention. Like elements are identified with the same reference numerals. It should be understood that elements shown as a single component may be replaced with multiple components, and elements shown as multiple components may be replaced with a single component. The drawings are not to scale and the proportion of certain elements may be exaggerated for the purpose of illustration.

DETAILED DESCRIPTION

Figure 1:
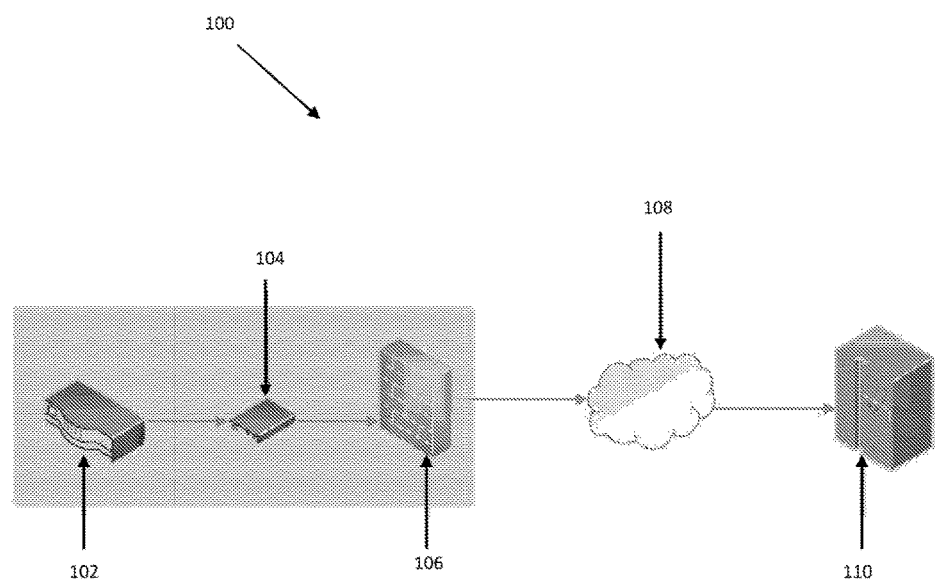
FIG. 1 illustrates an example red/black architecture.
Figure 2:
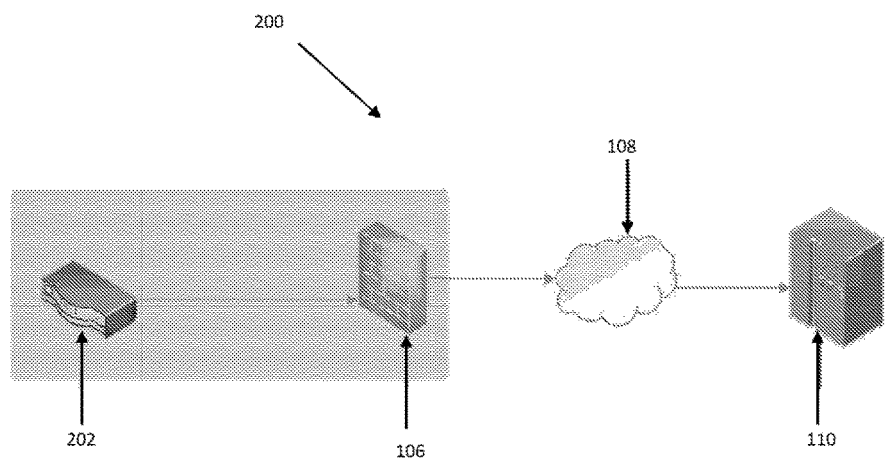
FIG. 2 illustrates an example CSfC architecture.
Figure 3:
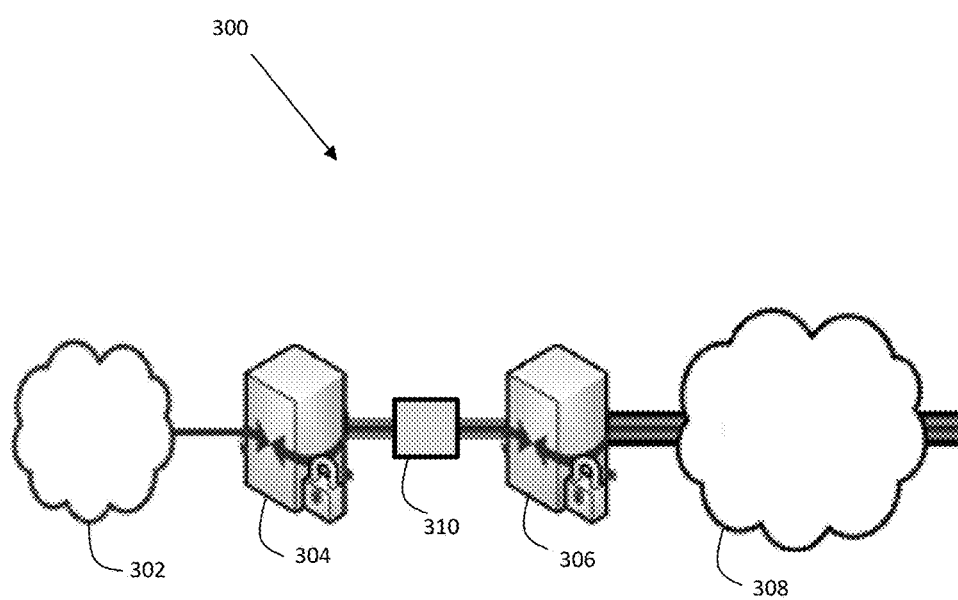
FIG. 3 illustrates an example secure communication system.

FIG. 3 illustrates an example secure communication system 300 that leverages the NSA's defined Virtual Private Network (hereinafter referred to as "VPN") Capability Package VPN CP 3.2 to implement a CSfC solution. Secure communication system 300 includes an inner VPN gateway 304 representing an inner tunnel for facilitating communication with a red network 302 and an outer VPN gateway 306 representing an outer tunnel for facilitating communication with a black network 308. The outer VPN gateway 306 encrypts data before data goes out to the black network while the inner VPN gateway 304 incorporates additional encryption algorithms in order to comply with NSA standards for secure communication. Thus, data on the black network has gone through two layers of encryption. In between the outer VPN gateway 306 and the inner VPN gateway 304 is a gray network 310 wherein data has only been encrypted one time.

Figure 4:
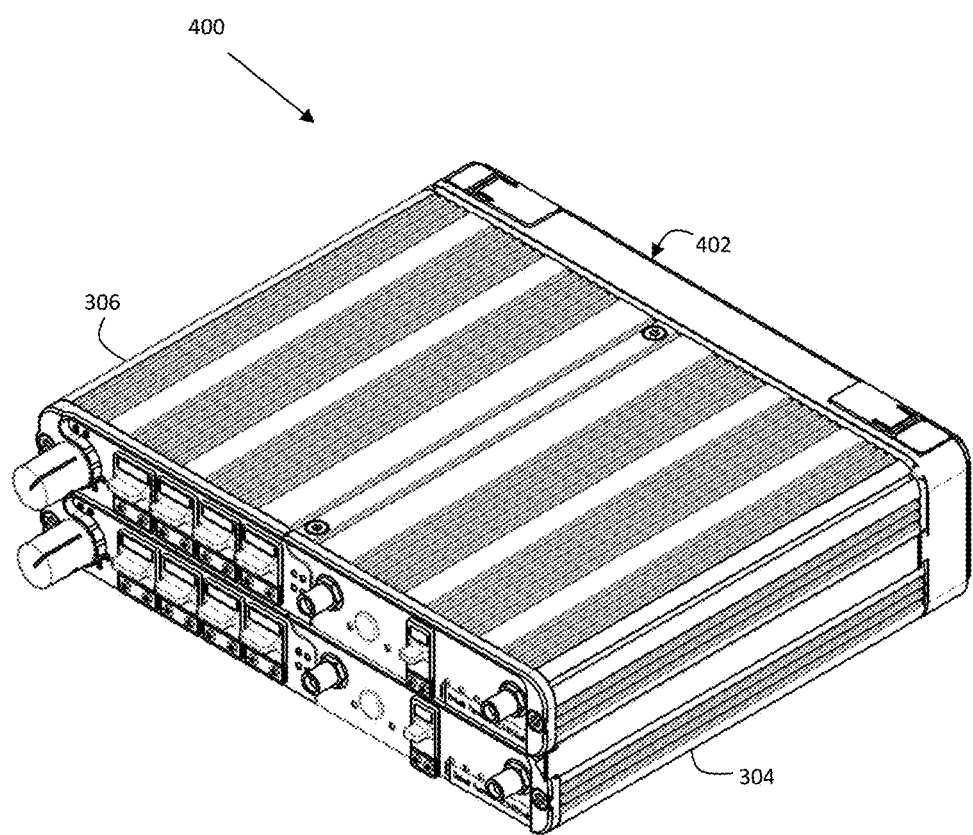
FIG. 4 illustrates an example secure communication system.

In one example, in order to promote convenience, ease of use, and portability, the inner VPN gateway 304 and the outer VPN gateway 306 are mechanically coupled by a power bracket 402, as illustrated in FIG. 4. The power bracket 402 also facilitates communication between the inner VPN gateway 304 and the outer VPN gateway 306 by engaging their respective Ethernet ports (not shown), thus creating a gray network in between the two. Therefore, two independent hardware components may be combined into a single portable system 400 for providing secure communication in accordance with NSA standards.

It should be appreciated that although reference has been made to a single portable system 400 that combines an inner gateway 304 and an outer gateway 306, such a system may similarly combine any two suitable computer or communication modules.

Figure 5:
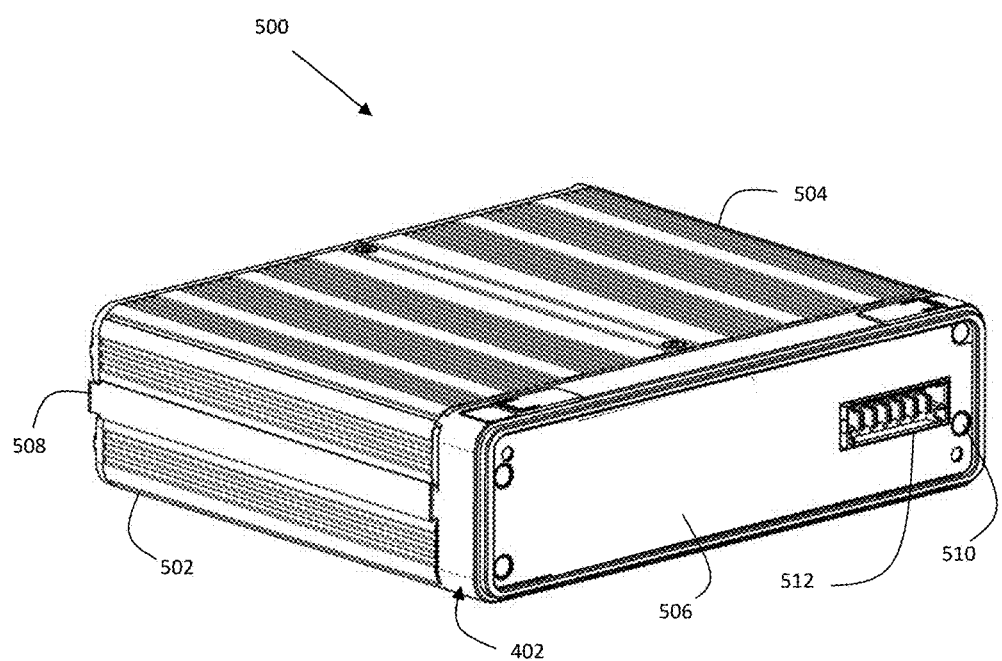
FIG. 5 illustrates an example power bracket system.
Figure 6:
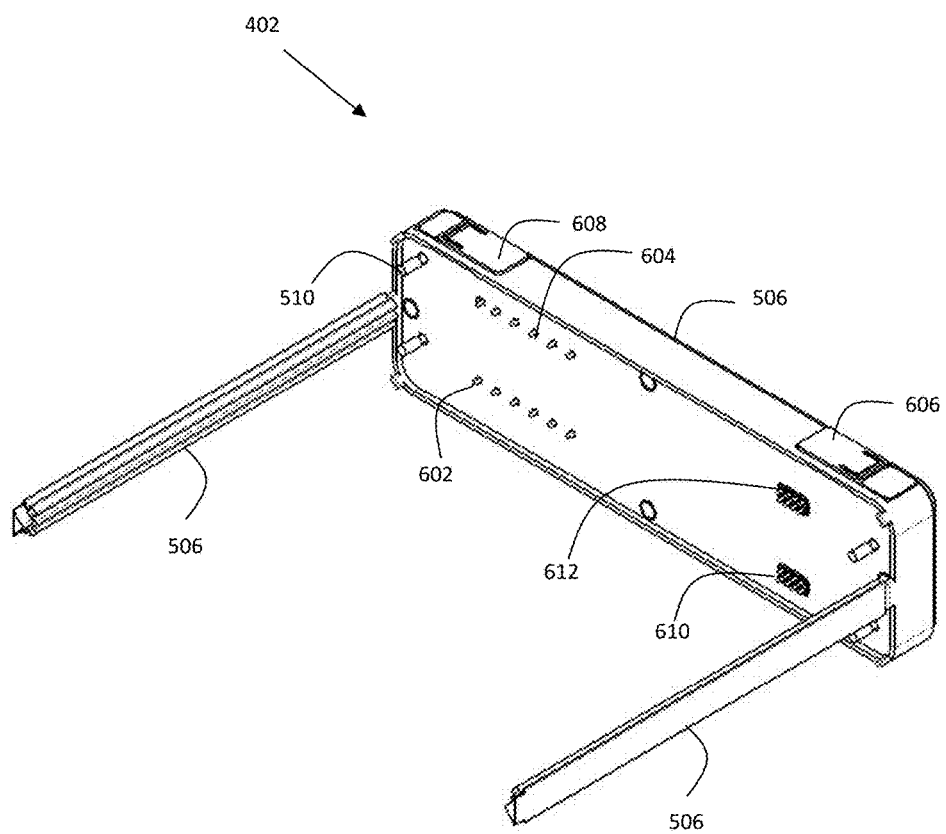
FIG. 6 illustrates an example power bracket system.

FIGS. 5 and 6 illustrate in more detail the power bracket 402 that combines a first module 502 and a second module 504 to form a single portable system 500. As previously described, the power bracket 402 mechanically couples the first module 502 and a second module 504 and also facilitates communication between the first module 502 and a second module 504. In particular, the power bracket 402 includes a front face panel 506 for electrically coupling a bottom module 502 and a top module 504. The power bracket 402 further includes a link extrusion 508 or linking arm that extends perpendicularly out from the front face panel 506 and is configured to hold a bottom module 502 and a top module 504 together. In one example, the power bracket 402 may include two link extrusions 508, a first one extending from a first end of the front face panel 506 and a second one extending from a second end of the front face panel 506. It should be appreciated that the link extrusion 508 may comprise any configuration or combination of configurations suitable for securing a bottom module 502 to a top module 504. For example, the link extrusion 508 may include one or more tabs configured to engage with one or more slots on modules 502 and 504. In one example, the link extrusion may include and adhesive or a magnet configured to secure the bottom module 502 to the top module 504. In addition, the front face panel 506 also includes features for securing the bottom module 502 to the top module 504. For example, the front face panel 506 includes one or more screws 510 configured to engage and secure a module mounted to the power bracket 402. In one example, the screw 510 may be a captive screw. In one example, the power bracket 402 includes 4 screws 510 positioned at the respective corners of the front face panel 506 wherein two top screws 510 are configured to engage the top module 504 and two bottom screws 510 are configured to engage the bottom module 502. It should be appreciated that the power bracket 402 may include any suitable number of screws 510 for securing the bottom module 502 with the top module 504.

The power bracket 402 further includes a power connector 512 for receiving DC power from an external power source via the front face panel 506. In one example, the power connector 512 is configured to receive Power over Ethernet. It should be appreciated that the power connector 512 may be any suitable type of connector for receiving power. In one example, the power connector 512 is a pin header connector.

The power bracket 402 further includes one or more bottom power contacts 602 configured to align with a power input region (not shown) of the bottom module 502 and to deliver power from the power connector 512 to the bottom module 502. The power bracket 402 further includes one or more top power contacts 604 configured to align with a power input region (not shown) of the top module 504 and to deliver power from the power connector 512 to the top module 504. In one example, the power contacts 602 and 604 are spring loaded. In one example, the power bracket 402 includes an AC-DC power supply (not shown) for converting AC power received at the power connector 512 to DC power before delivering DC power to the power contacts 602 and 604.

The power bracket 402 further includes a first Ethernet port 606 for providing Ethernet connectivity to the bottom module 502 and a second Ethernet port 608 for providing Ethernet connectivity to the top module 504. In one example, when using the power bracket 402 for implementing a CSfC solution, the first Ethernet port 606 may constitute a red Ethernet port while the second Ethernet port 608 may constitute a black Ethernet port. The power bracket 402 further includes one or more bottom Ethernet contacts 610 for connecting the first Ethernet port 606 to the bottom module's 502 Ethernet port (not shown) and one or more top Ethernet contacts 612 for connecting the second Ethernet port 608 to the top module's 504 Ethernet port (not shown). In one example, the bottom Ethernet contacts 610 and the top Ethernet contacts 612 are spring loaded.

Referring again to FIG. 3, it should be appreciated that the secure communication system 300 may incorporate a variety of suitable configurations. For example, the secure communication system 300 may incorporate KLAS Telecom Voyager products. More specifically, in a first option, the outer VPN gateway 306 is implanted using a VoyagerERm based on a Cisco 5915 embedded router while the inner VPN gateway 304 is implemented using a VoyagerVMm Adaptive Security Virtual Appliance ("vASA"). Such a configuration is advantageous in that it offers diverse WAN options including Wi-Fi, Cellular, and Ethernet. Incorporating embedded wireless capabilities in the outer VPN gateway 306 facilitates improved communication capabilities.

In a second option, the outer VPN gateway 306 is implemented using a VoyagerERm based on a Cisco 5915 embedded router while the inner VPN gateway 304 is replaced with a VoyagerESm. Such a configuration also offers the same diverse WAN options as the first example. In addition, this second option provides for a removable configuration feature. In particular, the VoyagerESm includes a removable storage device (not shown). The VoyagerESm retrieves configuration data from the removable storage device at boot time. This offers more flexibility in configuring the secure communication system 300. In addition, since the VoyagerESm is inoperable without configuration data, the removable storage device serves as an ignition key wherein the secure communication system 300 will not boot up with the removable storage device first being inserted. Similarly, the secure communication system 300 will shut down if the removable storage device is removed during operation.

Figure 7:
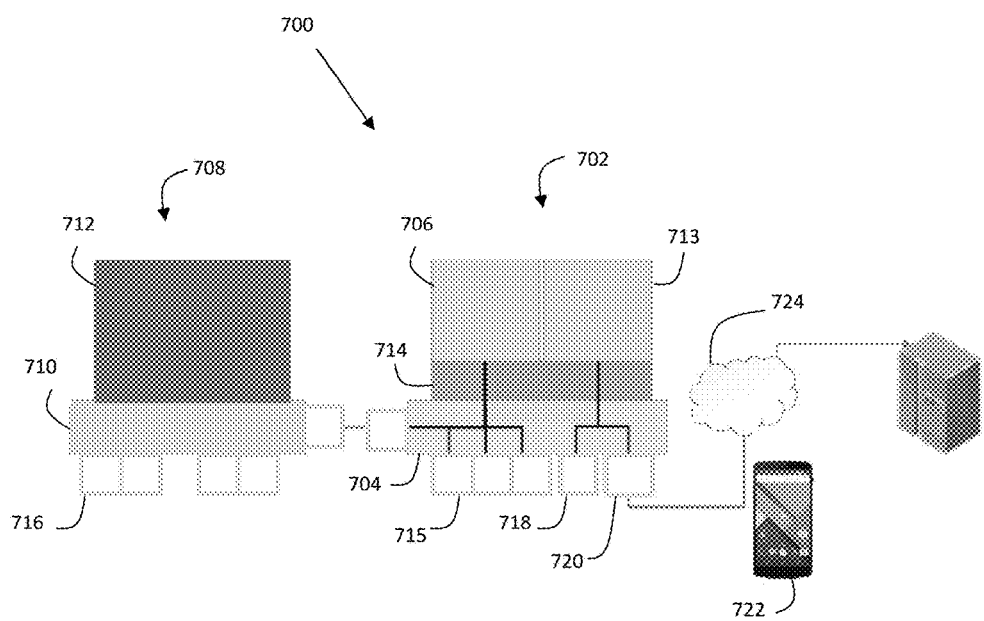
FIG. 7 illustrates an example secure communication system.

As illustrated in FIG. 7, in a third option, an example secure communication system 700 is implemented similarly to the first option but in reverse in order to enable support for multicasting and VoIP. In particular, the outer VPN gateway 702 is implemented using a VoyagerVMm 704, which is built on Adaptive Security Virtual Appliance ("ASAv") 706, while the inner VPN gateway 708 is implemented using a VoyagerERm 710 based on a Cisco 5915 embedded router 712. The outer VPN gateway 702 further includes an operating system 713, such the KlasOS operating system. The outer VPN gateway 702 further includes a hypervisor 714 for managing virtual machine resources. The outer VPN gateway 702 and the inner VPN gateway 708 further include Ethernet ports 715 and 716, respectively, to facilitate communication.

The outer VPN gateway 702 further includes a removable USB storage device 718 for storing configuration information as well as for serving as an ignition switch.

The outer VPN gateway 702 further includes a tether interface 720 such as a USB tether, for example, to facilitate tethering to a mobile communication device 722 in order to enable transparent communication over a wireless network 724.

Figure 8:
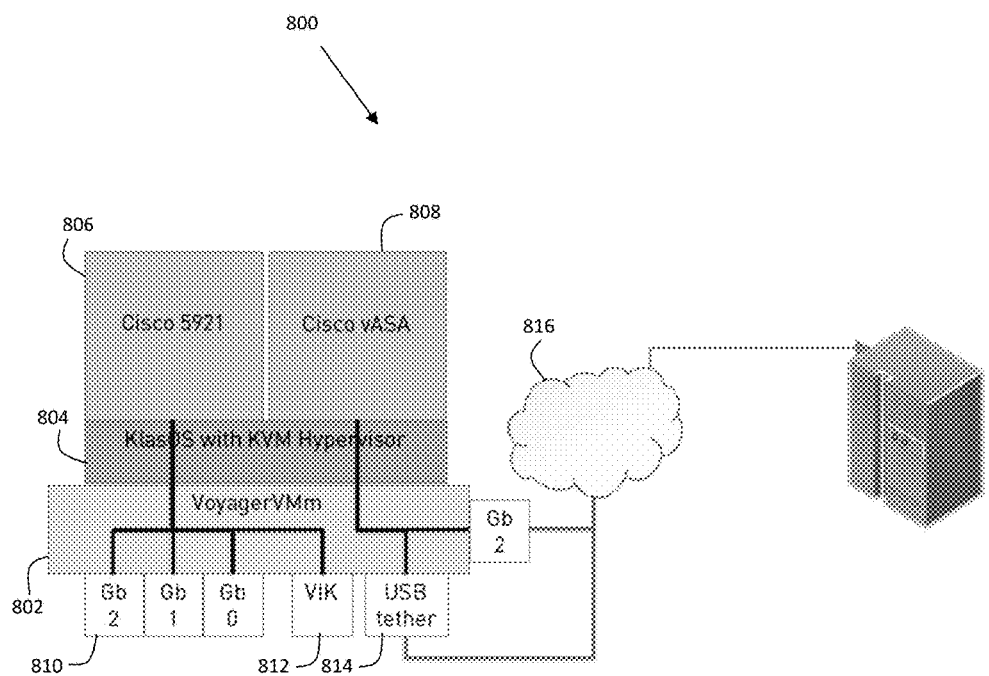
FIG. 8 illustrates an example secure communication system.

In one example, as illustrated in FIG. 8, a secure communication system 800 implements both an inner tunnel and an outer tunnel using a single hardware component or host computer. In this example embodiment, both an inner VPN gateway and an outer VPN gateway are implemented using a VoyagerVMm 802. In particular, an operating system, such as the KlasOS, with a hypervisor manages resources of the VoyagerVMm in order to provide two virtual computing environments. In a first virtual environment, an inner VPN gateway is implemented based on a Cisco 5915 embedded router 806. In a second virtual environment, an outer VPN gateway is implemented based on Cisco vASA 808.

It should be appreciated that eliminating hardware component and implementing both an inner tunnel and an outer tunnel using a single hardware component may reduce overall costs of a secure communication system while also proving for increased flexibility and portability.

The secure communication system 800 further includes Ethernet ports 810 to facilitate communication. The secure communication system 800 further includes a removable USB storage device 812 for storing configuration information as well as for serving as an ignition switch.

The secure communication system 800 further includes a tether interface 814 such as a USB tether for example, to facilitate tethering to a mobile communication device (not shown) in order to enable transparent communication over a wireless network 816. In one example, the tether 814 may be replaced with a built-in modem to facilitate wireless communication. For example, the secure communication system 800 may include a built-in Wi-Fi modem or a 3G/LTE modem with a SIM card slot (not shown).

Figure 9:
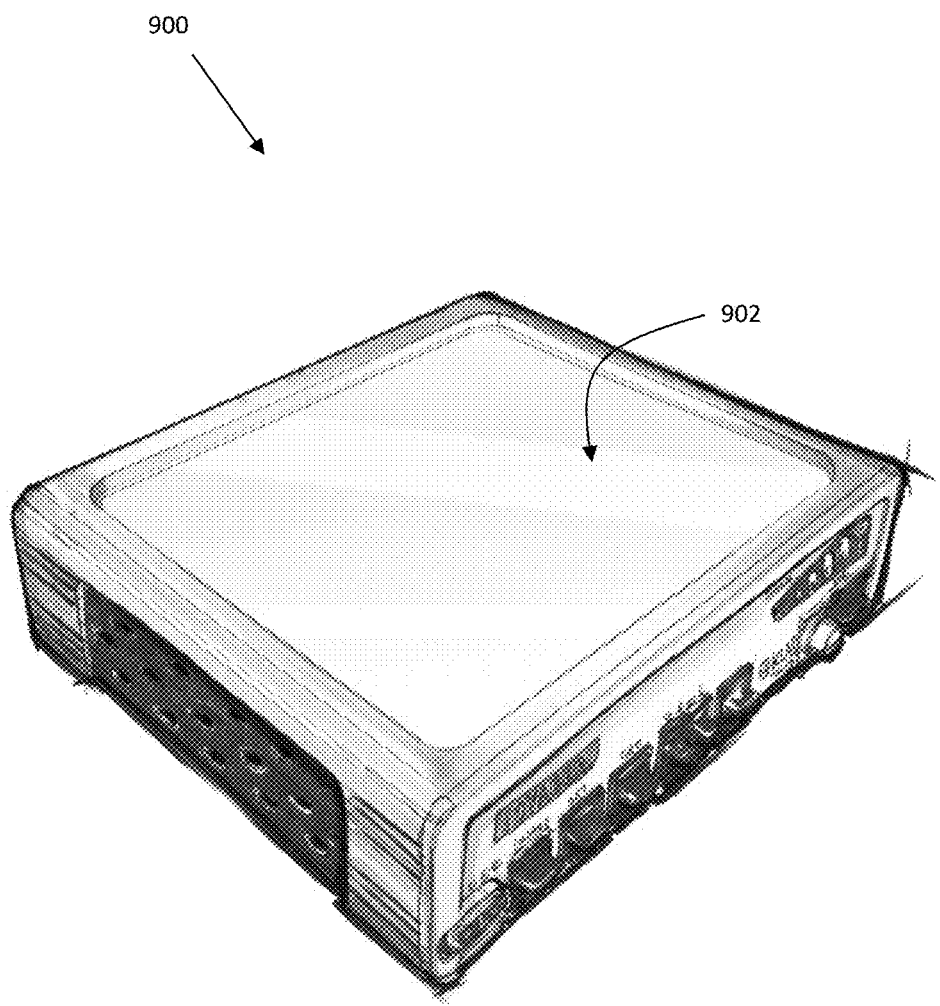
FIG. 9 illustrates an example secure communication system.

In one example, as illustrated in FIG. 9, an example secure communication system 900 includes a touch screen interface 902 to facilitate interaction with the secure communication system 900. For example, the touch screen interface 902 may enable a user to perform suitable functions such as selecting and configuring a network, registering with a Wi-Fi, and so on. The touch screen interface 902 may also be configured to provide a user with information, such as a status of a network. It should be appreciated that the touch screen interface 902 can include any suitable type of display such an LCD display.

Figure 10:
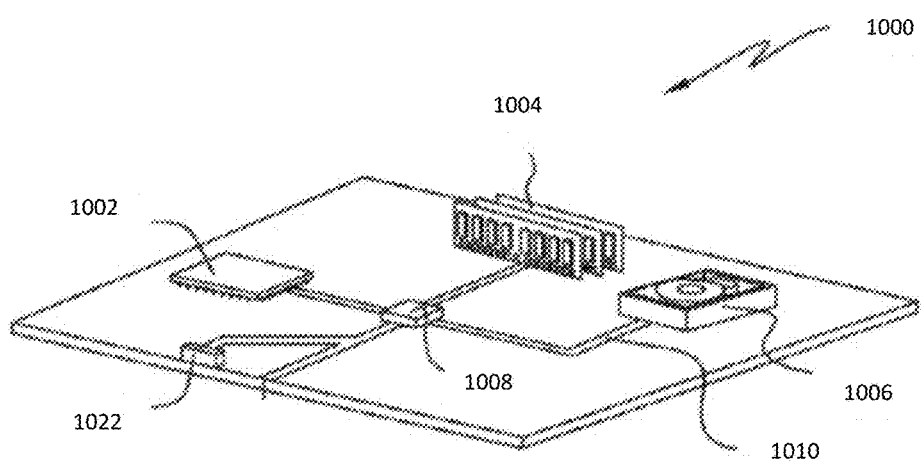
FIG. 10 is a schematic diagram of an example computer for implementing an example secure communication system.

FIG. 10 is a schematic diagram of an example computer 1000 for implementing a secure communication system. Computer 1000 includes a processor 1002, memory 1004, a storage device 1006, and a communication port 1022, operably connected by an interface 1008 via a bus 1010.

Processor 1002 processes instructions, via memory 1004, for execution within computer 1000. In an example embodiment, multiple processors, along with multiple memories, may be used.

Memory 1004 may be volatile memory or non-volatile memory. Memory 1004 may be a computer-readable medium, such as a magnetic disk or optical disk. Storage device 1006 may be a computer-readable medium, such as floppy disk devices, a hard disk device, optical disk device, a tape device, a flash memory, phase change memory, or other similar solid state memory device, or an array of devices, including devices in a storage area network of other configurations. In one example, the storage device 1006 includes dual solid state disk drives. A computer program product can be tangibly embodied in a computer-readable medium such as memory 1004 or storage device 1006.

While example systems, methods, and so on have been illustrated by describing examples, and while the examples have been described in considerable detail, it is not the intention to restrict or in any way limit the scope of the appended claims to such detail. It is, of course, not possible to describe every conceivable combination of components or methodologies for purposes of describing the systems, methods, and so on described herein. Additional advantages and modifications will readily appear to those skilled in the art. Therefore, the invention is not limited to the specific details and illustrative examples shown or described. Thus, this application is intended to embrace alterations, modifications, and variations that fall within the scope of the appended claims. Furthermore, the preceding description is not meant to limit the scope of the invention. Rather, the scope of the invention is to be determined by the appended claims and their equivalents.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995). Also, to the extent that the terms "in" or "into" are used in the specification or the claims, it is intended to additionally mean "on" or "onto." Furthermore, to the extent the term "connect" is used in the specification or claims, it is intended to mean not only "directly connected to," but also "indirectly connected to" such as connected through another component or components.

The invention claimed is:

1. A power bracket system for mechanically coupling and facilitating communication between a first and second module to form a single portable system, comprising:
   a panel for electrically coupling to a first module and a second module;
   a linking arm, extending substantially perpendicularly from the panel, for mechanically coupling the first module disposed on top of the second module;
   a power connector disposed on the panel for receiving DC power from an external power source;
   a top power contact configured to align with a power input region of the top module and to deliver power from the power connector to the top module;
   a bottom power contact configured to align with a power input region of the bottom module and to deliver power from the power connector to the bottom module;
   a first Ethernet port;
   a second Ethernet port;
   a top Ethernet connector electrically coupled with the second Ethernet port and configured for connecting the second Ethernet port to the top module; and
   a bottom Ethernet connector electrically coupled with the first Ethernet port and configured for connecting the first Ethernet port to the bottom module,
   wherein the first Ethernet port and the second Ethernet port are disposed on the panel.

2. The power bracket system of claim 1, wherein the first module comprises an inner VPN gateway representing an inner tunnel for facilitating communication with a red network and the second module comprises an outer VPN gateway representing an outer tunnel for facilitating communication with a black network.

3. The power bracket system of claim 1, wherein the panel comprises a plurality of screws engage and secure the first module and the second module.

4. The power bracket system of claim 1, wherein the linking arm comprises a tab configured to engage with a slot of a module.

5. The power bracket system of claim 1, wherein the top power contact and the bottom power contact comprise a spring-loaded contact.

6. The power bracket system of claim 1, wherein the top Ethernet connector and the bottom Ethernet connector comprise spring-loaded contacts.

7. The power bracket system of claim 1, wherein the power connector is a pin head connector.

8. The power bracket system of claim 1, further comprising an AC-DC power supply for converting AC power received at the power connector to DC power before delivering DC power to the top and bottom power contacts.

9. The power bracket system of claim 1, wherein the power connector is configured to receive Power over Ethernet.

* * * * *